Jan. 6, 1970   H. HEIMBERGER   3,488,239
METHOD OF MAKING A SLIDE FASTENER ASSEMBLY HAVING
IMPROVED CONNECTING MEANS AT ITS STARTING END
Filed July 5, 1966   2 Sheets-Sheet 1

Helmut Heimberger
INVENTOR.

BY
Karl F. Ross
Attorney

Helmut Heimberger
INVENTOR.

BY Karl F. Ross
Attorney

United States Patent Office 3,488,239
Patented Jan. 6, 1970

3,488,239
METHOD OF MAKING A SLIDE FASTENER ASSEMBLY HAVING IMPROVED CONNECTING MEANS AT ITS STARTING END
Helmut Heimberger, Essen, Germany, assignor to Firma Opti-Werk G.m.b.H. & Co., Essen, Germany, a German corporation
Filed July 5, 1966, Ser. No. 562,877
Claims priority, application Germany, July 6, 1965, O 10,960
Int. Cl. A44b 19/36, 19/38
U.S. Cl. 156—66    7 Claims

ABSTRACT OF THE DISCLOSURE

A method of making a separable slide-fastener stringer in which, at an end of the stringer, a pair of thermoplastic ribs is formed in line with the continuous thermoplastic coupling elements and from the material of these elements on the respective coupling heads, under heat and pressure, a metallic female connecting member being then clamped over one of these ribs or being thermally welded thereto, the other rib forming at least in part a male connecting member engageable with the female connecting member.

---

My present invention relates to an improved separable slide-fastener arrangement having a pair of matingly interengageable slide-fastener halves each provided with a support tape or band and a slide-fastener coupling element along the edge of this band.

It is known to produce slide strips by severing a continuous web of interconnected slide-fastener halves at spaced locations along this web and to apply thereto transverse reinforcing strips of a thermoplastic material which may be molded to form endstop members therefrom. In general, the carrier band may be a fabric or a film of thermoplastic filament (e.g. nylon thread) or of a thermoplastic foil, while the coupling element is constituted of molecularly oriented linear polymeric material (e.g. a polyamide such as nylon). The coupling element may either be of helically wound or meandering configuration or of individual element parts with the successive turns of each element matingly interengageable with the turns of the other element.

In my copending applications Ser. Nos. 543,921 (now abandoned), 543,974, 544,487 (now Patent No. 3,431,337) and 545,587 (now abandoned) filed Apr. 20, 1966, Apr. 20, 1966, Apr. 22, 1966, and Apr. 27, 1966 respectively, I describe methods of forming such slide-fastener assemblies, although primarily of the nonseparable type, wherein the endstop members at least at one extremity and generally at both extremities connect the slide-fastener halves together. When separable slide-fasteners are described herein, it is intended to refer to slide fasteners having at least one end at which the slide-fastener halves can be separated from one another by withdrawal of a respective extremity of a slide-fastener half from the slider. Slide fasteners of this type are most commonly used in garments.

It has been found that thermoplastic slide-fastener assemblies having coupling elements of the character described encounter difficulties when they are intended to be separated because of the inability to precisely align the coupling elements of the juxtaposed slide-fastener halves for receiving the slider. The separable ends of the starting side of the slide fastener must, therefore, be provided with a plug-like formation or male member on one of the slide-fastener halves (usually in line with its coupling element) while the other slide-fastener half is formed with a female member or socket into which the plug member can be inserted to properly position the coupling elements for fastener closure. In most cases, the plug element must be inserted through the corresponding channel in the slider so that the fastener-closing operation involves the positioning of the slider in abutting engagement with the female member, the insertion of the male member into the female member through this channel of the slider, and the movement of the slider along both coupling elements while the mating extremities thereof are held by the user. Heretofore, the male and female members have been mounted on the individual slide fasteners. Such prior art were expensive and time-consuming as will be apparent hereinafter and frequently resulted in a poor transition from the connecting members to the coupling elements with ensuing difficulties in opening and closing the slide fastener.

It is, accordingly, the principal object of the present invention to provide an improved method of making separable slide fasteners having mating male and female connecting members at least at one extremity.

The further object of this invention is to provide a method of the character described whereby the disadvantages of prior systems can be obviated and the connecting members formed in a relatively inexpensive and simple manner with the necessary savings.

Yet a further object of this invention is to provide a slide-fastener assembly having improved connecting means at its starting end.

These objects and others which will become apparent hereinafter are attainable, in accordance with the principles of this invention, by providing a substantially continuous slide-fastener support band strip whose slide-fastener halves are interconnected and are provided with a reinforcing web at the separable ends of the slide fastener. The reinforcing strip is a synthetic-resin thermoplastic foil which is applied to the thermoplastic coupling element of each slide-fastener half on one or both sides thereof. This synthetic-resin foil and/or the thermoplastic coupling element of one or both slide-fastener halves are shaped into respective ribs for the male and female members under the application of heat and pressure prior to separation of the slide fastener into individual lengths. The invention resides primarily in the formation at the male and female coupling parts, prior to such separation, with spaced formations of predetermined mutual orientation. These spaced formations or bodies of synthetic-resin are produced by molding under heat and pressure and, after separation of the individual length of slide fastener in the region of these bodies receive the female member which is applied through heat and pressure. The formation of endstop members at both ends of nonseparable slide fasteners with the application of synthetic-resin foils and by applying a thermoplastic coating material to the carrier band are described in the copending applications mentioned above. It is also observed in these applications that it is possible to form locking members or detents for preventing withdrawal of the slider after it has been drawn onto the coupling element. This state of the art has not, however, had any material influence upon the technology of separable slide fasteners.

I have now discovered that these disadvantages can be thoroughly avoided; instead of forming at least the female connecting member from the synthetic-resin material deposited as reinforcement foil or constituting the coupling element of a respective slide-fastener half, it is possible to mount the female connecting member properly (i.e. with the exact orientation necessary to ensure continuous interengagement of the coupling elements upon movement of the slider) by seating the box-like female member at this end of the slide fastener when the synthetic-resin foil or the thermoplastic coupling element at this extremity is shaped into a rib or mass of thermoplastic material prior to the application of the female member. These ribs of thermoplastic material may be considered shaped masses adapted to be integrated into or constitute at least part of the male and female members; for this purpose the bodies preferably extend longitudinally in alignment with the respective coupling element the full length of the terminal reinforcing strip at the openable end of the slide fastener. The thermoplastic body or rib at the male side may have a width slightly less than half the width of the interengaged coupling elements and may be beveled at this leading edge so as to pass easily into the respective channel of the slider and into the female member. Thus the male member may be constituted solely by this body or rib which rises from the support-band at the separable end of the slide fastener. The rib or body at the female side can have a width equal to half the width of the interconnected coupling element and thus may extend inwardly to a median line between the slide-fastener halves and can, accordingly, receive the female member.

According to the further aspect of this invention, the female connecting member (and also the male connecting member if desired) may be composed of a metal and can accordingly be sheet-metal sheaths pressed and clamped around these ribs or bodies. When the male and/or female members are constituted of thermoplastic resin, they may be applied by thermal welding to the ribs and preferably envelop them. Furthermore, it has been found to be highly advantageous to provide at least one of these thermoplastic and subsequently applied members with a laterally extending flange which can be thermally bonded to the substrate which may be provided with a resilient slider-engaging detent formation adapted to prevent twisting movement of the slider about the coupling element and to limit any bending of the slide-fastener strip to disalign the female member and the channel of the slider; the formation can be cammed away to release the slider and permit closing of the slide fastener.

According to yet another feature of this invention, in the region of these shaped bodies or ribs, on one or both slide-fastener halves and along the upper and/or lower surface of the slide-fastener strip, I provide a web of filamentary reinforcement which is banded to the coupling element and/or the foil overlay at the same time that the shaped ribs or bodies are formed. In this manner, flowable synthetic resin is forced into the interstices of the reinforcing fabric which is drawn into shaped ribs to form a channel-type reinforcement. Advantageously, the web is composed of metal wire or wire of a filamentary synthetic resin. The latter reinforcement preferably is a polyester or other thermoplastic material whose softening point or melting point is higher than the corresponding point with the synthetic resin constituting the reinforcement foil or the coupling element to which it is bonded.

I have found that the bodies of thermoplastic material along the confronting edges of a respective extremity of the continuous interconnected slide-fastener strip can be formed most advantageously by applying heat and pressure to the continuous band at spaced apart locations with a forming die having fingers or feelers in comb-like configuration which engage the gaps between successive turns of both of the interconnected coupling elements. Advantageously, at least three such feelers or positioning fingers are provided, two of which are spaced apart in the direction of movement of the continuous band and in the major dimension of the coupling elements by a distance equal approximately to the thickness of one turn of the coupling elements while another finger is disposed adjacent the head of this turn. In this manner, the three positioning fingers are disposed at the vertices of an equilateral triangle whose base is defined by the positioning pins flanking a respective turn of one coupling element and received between the turns thereof. The apex of the triangle is a further positioning head which passes through the space between turns of the other coupling element which receives the first-mentioned turn. A precise positioning of both coupling elements and the band as well as a proper centering of the forming die for making the masses or bodies of thermoplastic material is assured. The dies or stamping members can be heated by electrical means or with the aid of a heating fluid in the manner set forth in one or more of the aforementioned copending applications, although best results have been attained with high-frequency inductive heating.

As previously mentioned, the reinforcing web applied to one or both surfaces of the respective extremities of the band, subsequent to the separation of the latter into individual lengths of slide fastener, can be of a material selected in accordance with the desired thickness of the slide-fastener ends and/or the necessary stiffness to facilitate insertion of the male fastener member into the female member subsequently mounted upon the other slide-fastener half. The prior methods of stiffening the end of a slide-fastener length having a textile layer constituting the carrier band by the use of textile sizes and other similar treatments has not been very satisfactory because repeated warm-water washing of the garment in which the slide fastener is incorporated gives rise to a dissolution of the stiffening agent and a loss of both the shape and stiffness of the end of the slide fastener; this markedly increases the difficulty with which the slide fastener can be opened and closed.

The system of the present invention, both with respect to its method aspect and with respect to its article aspect, represents a significant improvement in the technology of separable slide fasteners in that it ensures an exact locating of the ribs at the openable end of the slide fastener so that the male and female connecting members associated with these ribs are also precisely positioned although at least the female member is applied subsequently to the severing of the continuous slide-fastener band into the individual lengths. The transition of the connecting members to the coupling elements thus presents no difficulty. The problem of the precise alignment of the coupling elements of a separable slide fastener is thus solved and the slider can be easily drawn onto the coupling elements over the full length of the slide fastener. Moreover the system of the present invention allows the principles of my earlier applications to be applied here as well. Thus the continuous slide-fastener band may be reinforced with strips of thermoplastic material at spaced apart locations, provided with molded endstop members and severed at these reinforced locations into individual lengths. In process of this type, the formation of the ribs prior to separation of the individual lengths in the reinforced region ensures the exact positioning of these ribs with reference to the connected position of the coupling elements. The female member can be applied after separation in an extremely simple operation.

Thus coupling elements of the continuous type (e.g. helical turns or meandering elements) as well as injection molded or other types of coupling element parts can be formed into or with the ribs at a corresponding location without difficulties of the type hitherto encountered in finished slide-fastener assemblies.

The above and other objects, features and advantages of the present invention will become more readily apparent from the following description, reference being made to the accompanying drawing in which.

Figure 1:
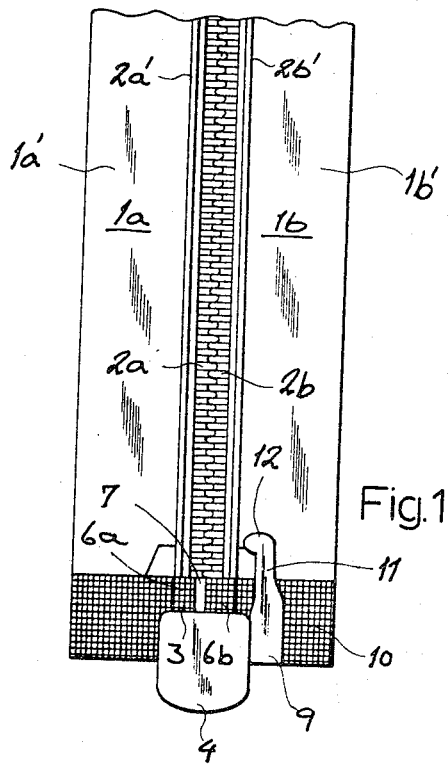
FIG. 1 is an elevational view of the lower part of a separable slide fastener according to this invention.
Figure 4:
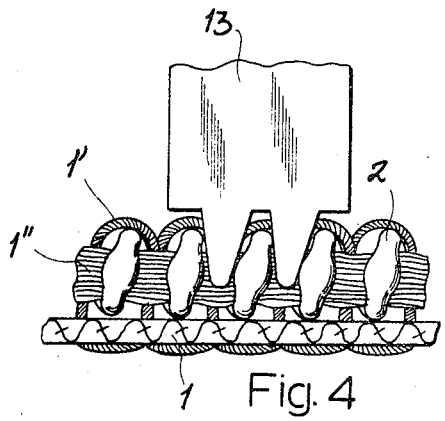
FIG. 4 is an elevational view diagrammatically illustrating the positioning of the rib-forming die with respect to the strip.

Referring first to FIG. 1 it will be seen that the separable slide fastener of the present invention, which may be provided at its upper end with individual end step members in the manner set forth in my copending applications mentioned earlier, comprises a pair of slide-fastener halves 1a and 1b whose coupling elements 2a and 2b are here shown to be interconnected (i.e. as if the slider were in its uppermost position). The coupling elements 2a and 2b may be meandering continuous strands of molecularly orientated thermoplastic, helical coils of such thermoplastic as described or coupling formations spaced uniformly along the respective support bands in the conventional manner. Further details of the coupling elements will be apparent from FIGS. 4–6. The coupling elements 2a and 2b are mounted upon the respective support bands 1a', 1b' by welt-stitching 2a', 2b' or chain-stitching arrangement using filler cords or the like. In the instant case, the support bands 1a' and 1b' are composed of synthetic-resin thermoplastic foils.

Figure 3:
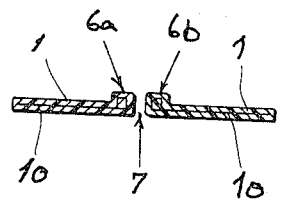
FIG. 3 is a cross-sectional view taken along the line III—III of FIG. 2.

As illustrated in FIGS. 1 and 3, the connecting portions of the slide fastener is provided with a male connecting member 3 in the form of a plug which is guided in a respective channel of a female connecting member or socket 4 which is of a conventional configuration as far as the plug-receiving portions is concerned. The female connecting member or socket 4 is mounted upon its slide-fastener half 1b after the individual length of slide fastener has been severed from the continuous strip 5 along the parting line 8 by the means and techniques fully set forth in the copending applications mentioned earlier.

Prior to cutting the individual lengths of slide fastener apart, I provide the slide-fastener strip with a pair of ribs 6a and 6b which may be molded from the thermoplastic synthetic-resin of the respective coupling elements 2a and 2b, from the thermoplastic material bands 1a' and 1b', and/or from a thermoplastic foil applied to the continuous strip 5 as described in the copending applications listed above. The molding of the male-member-forming rib 6a and the female-member receiving rib 6b is carried out by the use of a forming die which simultaneously separates the ribs from one another along a parting cap 7. The pair of ribs 6a and 6b is spaced from the similar ribs formed at other locations along the continuous strip 5 without any possibility of disalignment of the coupling elements since they are all formed only upon a strip whose elements are connected.

After separation of the individual lengths of slide fastener along the transverse lines 8, a metal cap can be clamped around rib 6a to form the male member 3 although it has been found that omission of this cap does not detrimentally affect the plug-and-socket connection. In fact excellent results are obtained when the plug or male member 3 is constituted only by the thermoplastic rib. Also, after such separation of the individual slide-fastener lengths, the female connecting member or socket 4 or socket is applied. In the system illustrated in FIGS. 1, 2, 3, the female connecting member or socket 4 is a box-like synthetic-resin member having a lateral flange 9 which is welded thermally to the reinforced band 1b' while being positively positioned by the rib 6b the female member 4 can be, moreover, thermally bonded to the rib 6b as well. According to a significant feature of this invention, the bonding flange 9 extends beyond the female member 4 and has a projection 11 which lies parallel to the coupling elements 2a, 2b and, therefore, the conventional slider. The projection 11, beyond the female connecting member or socket 4, has a hook 12 extending inwardly toward the coupling members 2a and 2b and engageable with slider in its lower position to prevent twisting and sliding thereof.

Figure 2:
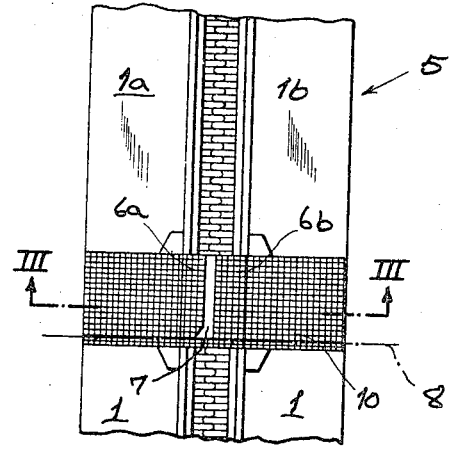
FIG. 2 is a similar view of a slide-fastener strip prior to the separation of the individual lengths of slide fastener.

As is also apparent from FIGS. 1–3, one or both sides of the support bands 1a' and 1b' may be formed in the region of the connecting members with a strip of wire fabric 10 which is embedded in the thermoplastic concurrently with the formation of the ribs 6a and 6b and thus not only stiffens the corresponding end of the individual slide fastener but also is incorporated in the ribs to strengthen them. Since the fabric is incorporated in the synthetic-resin mass, the stiffness of the slide fastener is not lost with washing. Furthermore, when metal fabrics are employed, no metal casing is required for the male member.

Figure 8:
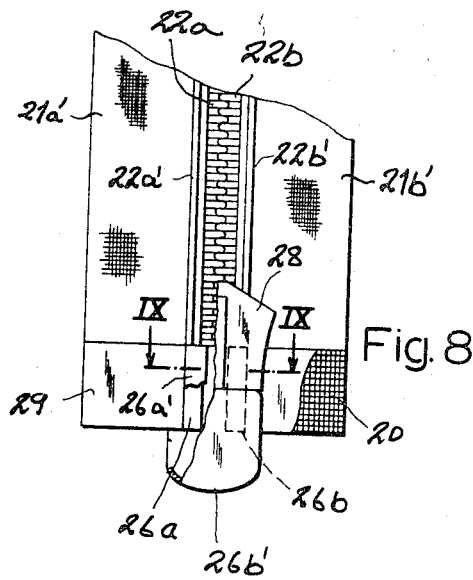
FIG. 8 is a view similar to FIG. 1 showing a modification.
Figure 9:
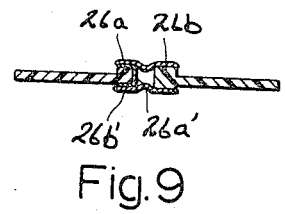
FIG. 9 is a cross-sectional view taken along line IX—IX of FIG. 8.

In FIGS. 8 and 9, I show a modified system wherein the fabric tapes or bands 21a' and 21b' of the slide fastener halves 21a, 21b, have thermoplastic coupling elements 22a and 22b held onto the fabric tapes by chain stitching at 22a' and 22b'. In this case, the overlay 20 of woven thermoplastic or metal wire is positioned upon the fabric band and a synthetic-resin foil 29 of thermoplastic material is applied thereover. When ribs 26a and 26b are now formed under heat and pressure, the foil 29 is softened and its thermoplastic material penetrates the woven layer 20. The male member 26a is here jacketed with a metal sheath 26a' while the metal female member 26b' of box-like configuration is clamped under pressure to the rib 26b. In this case, the female member 26b' is a conventional construction. The slider is here shown fragmentarily at 28.

Figure 7:
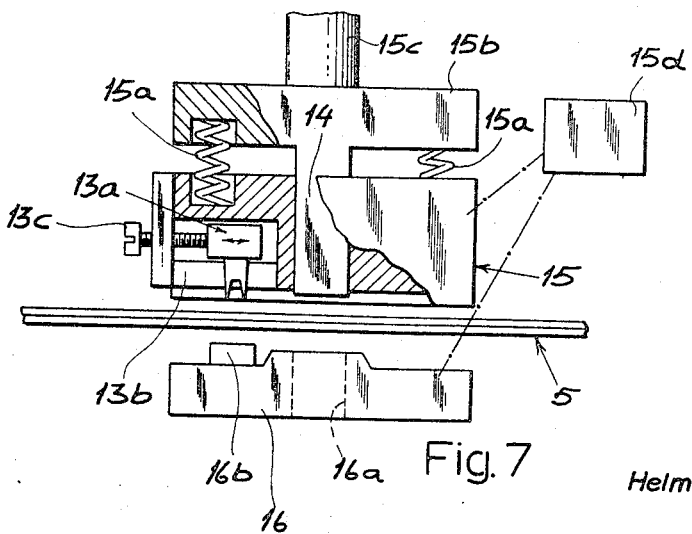
FIG. 7 is an elevational view, partly broken away and partly in diagrammatic form, of an apparatus for forming the ribs in accordance with the principles of the present invention.

As set forth earlier, an important feature of this invention resides in the manner in which the ribs 6a, 6b and 26a, 26b are formed. In the apparatus illustrated in FIG. 7, the die 15 is disposed above the continuous strip 5 while the cutting plate 16 is positioned therebelow. The die 15 has formations designed to produce the ribs and generally of the type illustrated and described in the aforementioned copending applications and is mounted via springs 15a upon a plate 15b of a plunger 15c. The latter also carries a punch 14 receivable in the opening 16a of cutting plate so that, upon downwardly movement of the plunger 15c, the die 15 will engage the strip 5 to mold the ribs and further movement of the plunger 15c will effect the removal of material in the zone 7 (FIGS. 1, 2, 3).

The heating of the strip 5 is here carried out inductively with the aid of a high-frequency alternating current source 15d connected across the die 15 and the cutting plate 16. In order to accurately position the strip 5 with respect to the die 15 the latter carries a positioning device 13a whose fingers or pins 13 (see FIGS. 4–6) are disposed at the vertices of an equilateral triangle and which are of comb-like configuration so that the teeth pass through the turns and establish the exact positions of the ribs upon the strip 5 while ensuring that the proper pitch of the turns is maintained.

Figure 5:
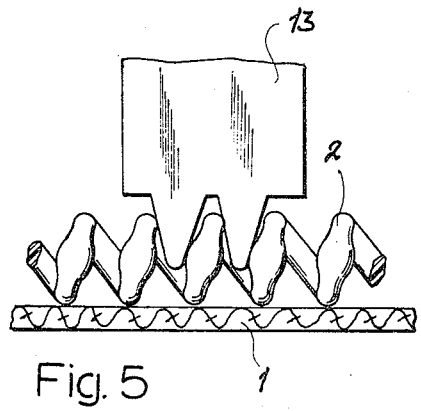
FIG. 5 is a view similar to FIG. 4 illustrating the positioning of the coupling element on the respective support band whereby the coupling element may be mounted simultaneously with the forming of the ribs.
Figure 6:
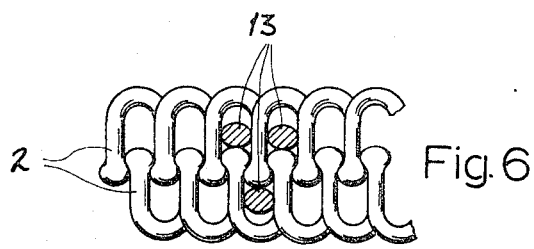
FIG. 6 is a plan view of the system of FIG. 5 with the positioning fingers shown in cross-section.

To permit adjustment of the fingers or pins 13, I have found it desirable to mount the pin lock 13a in a guide slot 13b extending parallel to the strip 5. A screw 13c permits the precise positioning of the fingers or pins 13 in longitudinal direction. To prevent damage to the fingers or pins 13, whose maximum diameter is equal to the width of the space between successive turns and thus approximately equal to the diameter of the filament forming the coupling elements, a rubber cushioning pad 16b is disposed on the cutting plate 16 directly beneath the fingers or pins 13. As illustrated in FIG. 6, two fingers or pins engage the flanks of one of the turns while the third finger or pin is disposed adjacent the flattened head thereof and between the turns of the other coupling elements. Moreover, the fingers or pins 13 taper downwardly so that they engage the turns in a wedging action. In the circumstances illustrated in FIG. 4, the pins or fingers 13 position a strip in which the coupling elements 2 have been fastened to the tape 1 by chain stitch 1' and a filler thread 1". There is no damage to either the chain stitch or the filler. In FIG. 5, the fingers 13 engage a coupling element 2 which can be simultaneously bonded to the tape 1 by stitching or by heat and pressure during the formation of the ribs described above.

I claim:
1. In a method of making separable slide fasteners, the improvement which comprises the steps of:
 (a) forming a continuous slide-fastener strip having a pair of longitudinally interconnected slide-fastener halves with respective support tapes and mating coupling elements along confronting edges of said tapes;
 (b) applying to at least one face of said strip at a location corresponding to the separable ends of the slide-fastener halves of at least one slide-fastener length to be severed from said strip, a transversely extending band of a wire fabric;
 (c) molding under heat and pressure a thermoplastic layer of synthetic resin onto said strip around said band and through the interstices thereof, while simultaneously molding from both said band of wire fabric and the synthetic resin encasing same, a pair of transversely spaced ribs projecting from said strip and aligned with the respective coupling elements, with the wire fabric being accumulated in said ribs to form cores therein;
 (d) severing said slide-fastener length from said strip through said band; and
 (e) thereafter mounting on one of the ribs of each pair a respective female connecting member adapted to receive a male connecting member formed at least in part by the other rib of said pair for closure of the slide-fastener length, said member being fixed to said one of said ribs.

2. The improvement defined in claim 1 wherein said coupling elements are composed of thermoplastic synthetic resin and said ribs are formed in step (c) exclusively from the thermoplastic of said coupling elements by molding the thermoplastic thereof under heat and pressure at said location around and through said band and into the configurations of said ribs.

3. The improvement defined in claim 1 wherein said slide-fastener strip is provided with a reinforcing foil of thermoplastic synthetic resin at said location, and said ribs are formed in step (c) by molding the thermoplastic of said foils under heat and pressure around and through said band and into the configurations of said ribs.

4. The improvement defined in claim 1 wherein said female connecting member is composed of metal and is fixed to said one of said ribs by clamping it thereon with pressure.

5. The improvement defined in claim 1 wherein said female connecting member is composed at least in part of a thermoplastic material and is fixed to said one of said ribs in step (c) by thermally welding it to said one of said ribs.

6. The improvement defined in claim 1 wherein said ribs are formed in step (c) by molding same with a forming die, further comprising the step of positioning said die relative to said coupling element by inserting a plurality of positioning fingers into openings in the coupling elements in their mated condition thereby guiding said die.

7. In a method of making separable slide fasteners wherein a pair of slide-fastener halves have respective support tapes and mating coupling elements along confronting edges of said tapes, the improvement which comprises the steps of:
 applying at one end of the slide fastener transversely of said support tapes and to at least one face of the latter, a wire-fabric band;
 molding around and through said band and onto said tapes a thermoplastic synthetic resin penetrating through the interstices of said wire-fabric band;
 simultaneously molding from both said band of wire fabric and the thermoplastic synthetic resin encasing same, a pair of ribs projecting from said tapes and aligned with the respective coupling elements, while accumulating within the ribs, the wire fabric so as to form cores of the wire fabric in said ribs; and
 thereafter mounting on one of the ribs a female connecting member adapted to receive a male connecting member formed at least in part by the other rib for closure of the slide fastener, said member being fixed to said one of said ribs by at least one of the steps of clamping said member onto said one of said ribs, and thermally welding said member to the thermoplastic synthetic resin of said one of said ribs.

References Cited

UNITED STATES PATENTS

| 3,162,918 | 12/1964 | Burbank | 24—205.11 |
| 3,190,779 | 6/1965 | Porepp | 156—66 |
| 3,224,061 | 12/1965 | Taylor | 24—205.11 |
| 3,340,594 | 9/1967 | Frohlich et al. | |

PHILIP DIER, Primary Examiner

U.S. Cl. X.R.

24—205.11; 29—408; 156—196, 581; 264—249, 581